(12) United States Patent
Pittman

(10) Patent No.: US 6,445,288 B1
(45) Date of Patent: Sep. 3, 2002

(54) AUTOMATIC TURN SIGNAL DEACTIVATION SYSTEM

(76) Inventor: Joseph C. Pittman, 13150 Bissonett #703, Houston, TX (US) 77099

( * ) Notice: Subject to any disclaimer, the term of this patent is extended or adjusted under 35 U.S.C. 154(b) by 0 days.

(21) Appl. No.: 09/220,937

(22) Filed: Dec. 24, 1998

(51) Int. Cl.⁷ .................................................. B60Q 1/34
(52) U.S. Cl. ...................... 340/465; 340/475; 340/476
(58) Field of Search .................. 340/465, 475, 340/477, 476, 427, 431, 432; 367/10.1

(56) References Cited

U.S. PATENT DOCUMENTS

| | | | | |
|---|---|---|---|---|
| 4,328,431 A | * | 5/1982 | Usami | 307/10.1 |
| 4,333,071 A | * | 6/1982 | Kira et al. | 340/475 |
| 4,431,984 A | * | 2/1984 | Bileck | 340/475 |
| 4,638,290 A | * | 1/1987 | Wagner | 340/475 |
| 4,962,366 A | * | 10/1990 | Hatanaka et al. | 340/476 |
| 5,260,685 A | * | 11/1993 | Parker | 340/477 |
| 5,291,020 A | * | 3/1994 | Lee | 250/342 |
| 5,414,407 A | * | 5/1995 | Gerrans et al. | 340/475 |
| 5,438,314 A | * | 8/1995 | Evans | 340/477 |
| 5,528,218 A | * | 6/1996 | Rigsby | 340/476 |
| 5,808,546 A | * | 9/1998 | Hayase et al. | 340/476 |

* cited by examiner

Primary Examiner—Nina Tong
(74) Attorney, Agent, or Firm—Kenneth A. Roddy

(57) ABSTRACT

A retrofittable automatic turn signal deactivation system is provided including a pair of solenoid assemblies each having a retracted orientation and an extended orientation only upon the actuation thereof for forcing a turn signal lever to its neutral position. The solenoid assemblies are each mounted on a retrofittable collar which is positioned about a steering column of the vehicle. A timer mechanism is included for actuating at least one of the solenoid assemblies only after the cessation of a predetermined delay.

5 Claims, 2 Drawing Sheets

AUTOMATIC TURN SIGNAL DEACTIVATION SYSTEM

BACKGROUND OF THE INVENTION

1. Field of the Invention

The present invention relates to turn signal control systems and more particularly pertains to a new automatic turn signal deactivation system for automatically deactivating a turn signal via a turn signal lever upon either the cessation of a delay or braking of a vehicle.

2. Description of the Prior Art

The use of turn signal control systems is known in the prior art. More specifically, turn signal control systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art turn signal control systems include U.S. Pat. Nos. 5,414,407; 5,438,314; 5,260,685; 5,291,020; 4,638,290; and 4,333,071.

In these respects, the automatic turn signal deactivation system according to the present invention substantially departs from the conventional concepts and designs of the prior art, and in so doing provides an apparatus primarily developed for the purpose of automatically deactivating a turn signal via a turn signal lever upon either the cessation of a delay or braking of a vehicle.

SUMMARY OF THE INVENTION

In view of the foregoing disadvantages inherent in the known types of turn signal control systems now present in the prior art, the present invention provides new automatic turn signal deactivation system construction wherein the same can be utilized for automatically deactivating a turn signal lever upon either the cessation of a delay or braking of a vehicle.

The general purpose of the present invention, which will be described subsequently in greater detail, is to provide a new automatic turn signal deactivation system apparatus and method which has many of the advantages of the turn signal control systems mentioned heretofore and many novel features that result in a new automatic turn signal deactivation system which is not anticipated, rendered obvious, suggested, or even implied by any of the prior art turn signal control systems, either alone or in any combination thereof.

To attain this, the present invention generally comprises a resilient collar defining a portion of cylinder and including an elongated slot formed therein. As shown in the Figures, such slot extends about a 20 degree angular section of the collar. A pair of free ends each have a lip integrally coupled thereto and extending radially therefrom with a pair of coaxial bores formed therein. By this structure, the collar is adapted for allowing the securement thereof about a steering column of a vehicle via a bolt. During use, a turn signal lever is situated within the elongated slot. A pair of arcuate housings are situated on opposite sides of the elongated slot. Each housing is equipped with a radius of curvature equal to that of the collar. Further, the housings each define a pair of facing open ends. As best shown in FIG. 2, each housing extends about a 90 degree angular section of the collar. Also included is a pair of spring-biased solenoid assemblies each situated within a corresponding one of the housings. Each solenoid assembly includes an arcuate plunger with a radius of curvature equal to that of the housing in which it is situated. Each plunger has an unbiased retracted orientation and a biased extended orientation only upon the actuation thereof for forcing the turn signal lever to its neutral position. Connected to the solenoid assemblies is an brake sensor for actuating both of the solenoid assemblies upon the detection of the depression of a brake pedal of the vehicle. Finally, a timer mechanism is positioned in each of the housings of the collar and connected to the solenoid assembly within the corresponding housing. The timer mechanism further includes a momentary switch situated within each housing. Such momentary switches are designed to close only upon being depressed by one of the plungers when the turn signal lever is actuated. The timer mechanism is for actuating the solenoid assembly only upon the depression of the momentary switch in combination with the cessation of the solenoid assembly after a predetermined delay.

There has thus been outlined, rather broadly, the more important features of the invention in order that the detailed description thereof that follows may be better understood, and in order that the present contribution to the art may be better. appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new automatic turn signal deactivation system apparatus and method which has many of the advantages of the turn signal control systems mentioned heretofore and many novel features that result in a new automatic turn signal deactivation system which is not anticipated, rendered obvious, suggested, or even implied by any of the prior art turn signal control systems, either alone or in any combination thereof.

It is another object of the present invention to provide a new automatic turn signal deactivation system which may be easily and efficiently manufactured and marketed.

It is a further object of the present invention to provide a new automatic turn signal deactivation system which is of a durable and reliable construction.

An even further object of the present invention is to provide a new automatic turn signal deactivation system which is susceptible of a low cost of manufacture with regard to both materials and labor, and which accordingly is then susceptible of low prices of sale to the consuming public, thereby making such automatic turn signal deactivation system economically available to the buying public.

Still yet another object of the present invention is to provide a new automatic turn signal deactivation system which provides in the apparatuses and methods of the prior art some of the advantages thereof, while simultaneously overcoming some of the disadvantages normally associated therewith.

Still another object of the present invention is to provide a new automatic turn signal deactivation system for automatically deactivating a turn signal lever upon either the cessation of a delay or braking of a vehicle.

Even still another object of the present invention is to provide a new automatic turn signal deactivation system that includes a pair of solenoid assemblies each having a retracted orientation and an extended orientation only upon the actuation thereof for forcing a turn signal lever to its neutral position. The solenoid assemblies are each mounted on a retrofittable collar which is positioned about a steering column of the vehicle. A timer mechanism is included for actuating at least one of the solenoid assemblies only after the cessation of a predetermined delay. The predetermined delay of the timer mechanism is initiated by the actuation of the turn signal lever.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
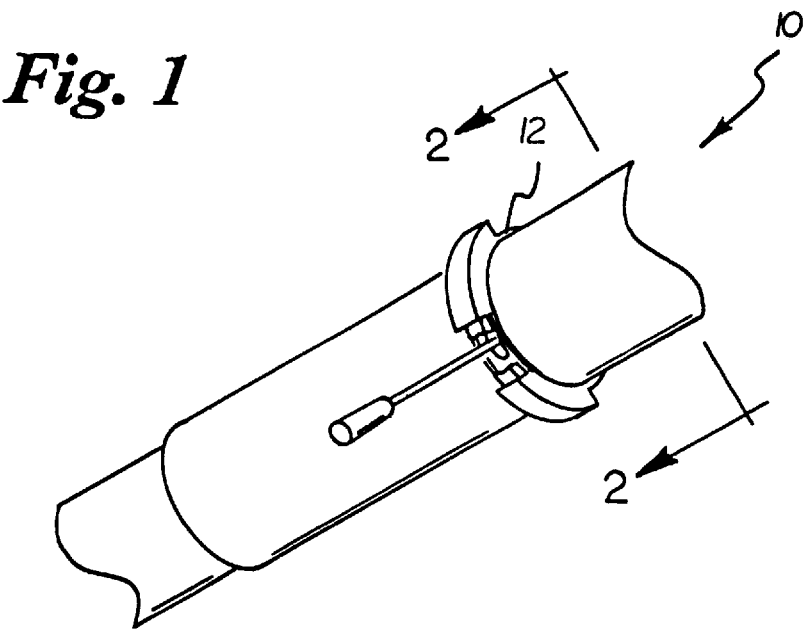
FIG. 1 is a perspective view of a new automatic turn signal deactivation system according to the present invention.

With reference now to the drawings, and in particular to FIGS. 1 through 4 thereof, a new automatic turn signal deactivation system embodying the principles and concepts of the present invention and generally designated by the reference numeral 10 will be described.

The present invention, designated as numeral 10, includes a resilient collar 12 defining a portion of cylinder and including an elongated slot 14 formed therein. As shown in the Figures, such slot extends about a 20 degree angular section of the collar. A pair of free ends 22 each have a lip integrally coupled thereto and extending radially therefrom. A pair of coaxial bores are formed in the lips. By this structure, the collar is adapted for allowing the securement thereof about a steering column of a vehicle via a bolt. During use, a turn signal lever is situated within the elongated slot and is movable therein.

Figure 2:
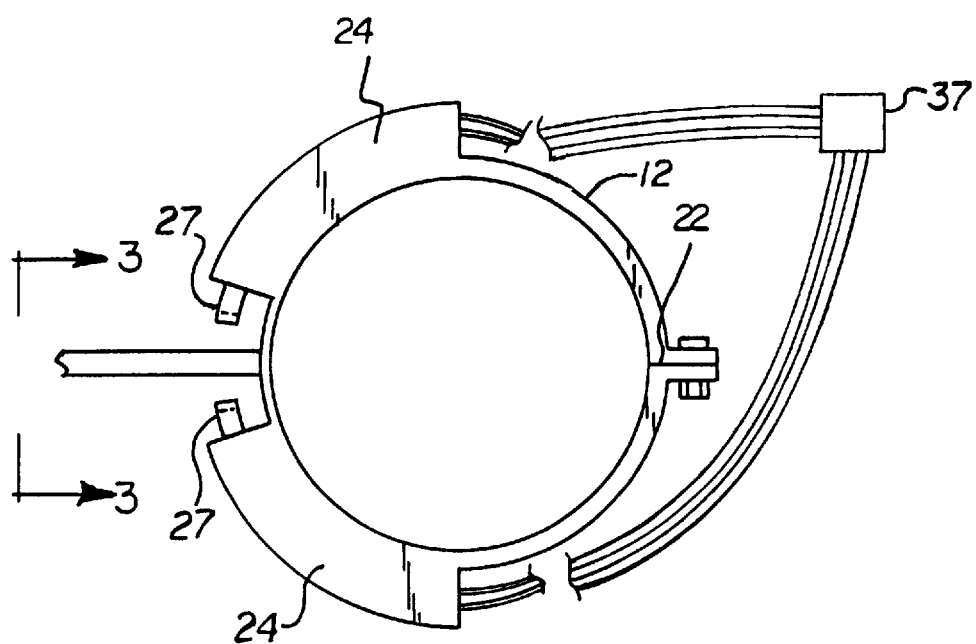
FIG. 2 is a front view of the present invention.
Figure 3:
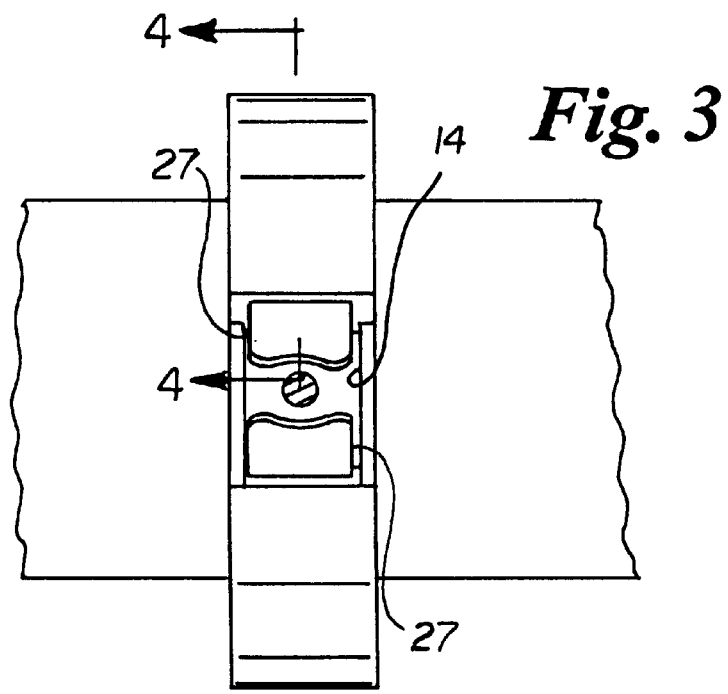
FIG. 3 is a side view of the present invention.

A pair of arcuate housings 24 are situated on the collar on opposite sides of the elongated slot. Each housing is equipped with a radius of curvature equal to that of the collar. Further, the housings each define a pair of facing open ends. As best shown in FIG. 2, each housing extends about a 90 degree angular section of the collar.

Also included is a pair of spring-biased solenoid assemblies 26 each situated within a corresponding one of the housings. Each solenoid assembly includes an arcuate plunger 27 with a radius of curvature equal to that of the housing in which it is situated. Each plunger has an unbiased retracted orientation and a biased extended orientation only upon the actuation thereof for forcing the turn signal lever to its neutral position.

Figure 4:
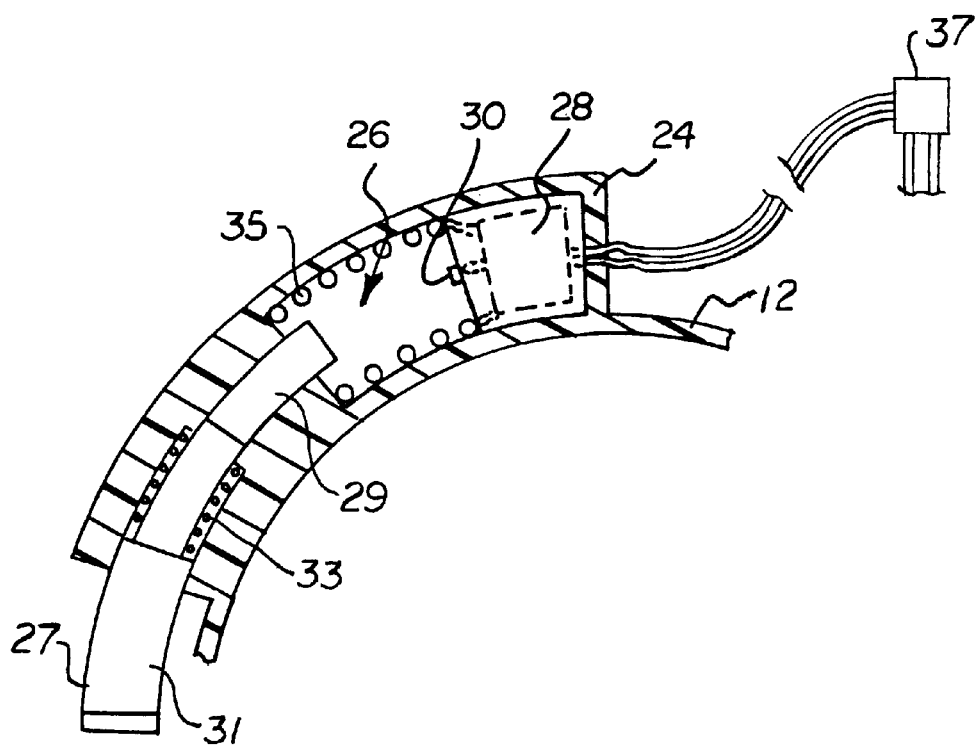
FIG. 4 is a side cross-sectional view of the present invention taken along line 4–4 shown in FIG. 3.

As shown in FIG. 4, each plunger has an inboard extent 29 with a circular cross-section and an outboard extent 31 defining an arcuate plate which has a width greater than a diameter associated with the inboard extent for reasons that will become apparent hereinafter. Each housing has an arcuate conduit with a diameter similar to that of the inboard extent of the plunger and a pair of compartments situated on each side. In a first one of the compartments, a spring 33 resides which encompasses the inboard extent of the plunger. A coil 35 is mounted in the other compartment for retaining the plunger in the retracted orientation until the coil is de-energized and the spring extends the plunger. Connected to the solenoid assemblies is an brake sensor 37 for actuating both of the solenoid assemblies upon the detection of the depression of a brake pedal of the vehicle. This feature is especially critical when the present invention is utilized with motorcycles.

Finally, a timer mechanism 28 is positioned in each of the housings of the collar and connected to the solenoid assembly within the corresponding housing. The timer mechanism further includes a momentary switch 30 situated within each housing. Such momentary switches are designed to close only upon being depressed by one of the plungers when the turn signal lever is actuated. The timer mechanism is for actuating the solenoid assembly only upon the depression of the momentary switch in combination with the cessation of the solenoid assembly after a predetermined delay of ideally 2 and ½ minutes.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An automatic turn signal deactivation system comprising, in combination:

a resilient collar defining a portion of cylinder and including an elongated slot formed therein and extending about a 20 degree angular section of the collar, a pair of free ends each having a lip integrally coupled thereto and extending radially therefrom with a pair of coaxial bores formed therein for allowing the securement of the collar about a steering column of a vehicle and bolted thereto with a turn signal lever situated within the elongated slot, and a pair of arcuate housings situated on opposite sides of the elongated slot with a radius of curvature equal to that of the collar and a pair of open ends, each housing extending about a 90 degree angular section of the collar;

a pair of spring-biased solenoid assemblies each situated within the corresponding one of the housings, each solenoid assembly including an arcuate plunger with a radius of curvature equal to that of the housing in which it is situated, each plunger having an unbiased retracted orientation and a biased extended orientation only upon the actuation thereof for forcing the turn signal lever to its neutral position;

a brake sensor connected to the solenoid assemblies for de-actuating either one of the actuated solenoid assemblies upon the detection of the depression of a brake pedal of the vehicle; and a respective timer mechanism positioned in each of the housings of the collar and connected to the solenoid assembly within the housing, each timer mechanism including a momentary switch situated within each housing which are positioned to close only upon being depressed by one of the plungers when the turn signal lever is actuated, the respective timer mechanism being for actuating the coil of the solenoid assembly of the respective housing to retain the plunger against the spring with the plunger in its retracted position upon the depression of the respective momentary switch, upon the cessation of a predetermined delay of the respective timer mechanism the coil of the solenoid assembly is de-actuating such that the spring is allowed to force the plunger into the extended position returning the turn signal lever to a neutral position thereby deactivating the turn signal.

2. An automatic turn signal deactivation system comprising:

at least one solenoid assembly having a retracted orientation and an extended orientation, the solenoid assembly being for forcing a turn signal lever to its neutral position upon the actuation thereof; and a brake sensor connected to the solenoid assembly for de-actuating the solenoid assembly upon the detection of the depression of a brake mechanism of the vehicles;

wherein the solenoid assembly is mounted on a collar which is positionable about a steering column of the vehicle;

wherein the collar is removable;

wherein the solenoid assembly includes an arcuate plunger;

wherein said collar further includes at least one timer mechanism having a momentary switch adapted to be closed by the plunger only when the turn signal lever is actuated, the timer mechanism being for actuating the solenoid assembly only upon the depression of the momentary switch and further de-actuating the solenoid assembly upon the cessation of a predetermined delay initiated by the momentary switch.

3. The automatic turn signal deactivation system of claim 2 including a pair of solenoid assemblies mounted on the collar.

4. The automatic turn signal deactivation system of claim 2 wherein the plunger of the solenoid assembly has an unbiased retracted orientation and a biased extended orientation only upon the actuation of the solenoid assembly for forcing the turn signal lever to its neutral position.

5. The automatic turn signal deactivation system of claim 2 wherein the collar defines a portion of cylinder and includes an elongated slot formed therein and extending about a 20 degree angular section of the collar, a pair of free ends each having a lip integrally coupled thereto and extending radially therefrom with a pair of coaxial bores formed therein for allowing the securement of the collar about a steering column of a vehicle and bolted thereto with a turn signal lever situated within the elongated slot, and a pair of arcuate housings situated on opposite sides of the elongated slot with a radius of curvature equal to that of the collar and a pair of open ends, each housing extending about a 90 degree angular section of the collar.

* * * * *